United States Patent
Stephens (10) Patent No.: US 8,380,758 B1
(45) Date of Patent: Feb. 19, 2013

(54) TRIE SPECIALIZATION ALLOWING STORAGE OF VALUE KEYED BY PATTERNS AND RETRIEVAL BY TOKENS

(75) Inventor: Omari Stephens, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/307,487

(22) Filed: Nov. 30, 2011

Related U.S. Application Data (60) Provisional application No. 61/559,719, filed on Nov. 14, 2011.

(51) Int. Cl.
*G06F 17/30* (2006.01)
*H04L 12/56* (2006.01)

(52) U.S. Cl. .......................... 707/803; 370/392
(58) Field of Classification Search .................. None
See application file for complete search history.

(56) References Cited

U.S. PATENT DOCUMENTS

| | | | | |
|---|---|---|---|---|
| 6,134,709 A | * | 10/2000 | Pratt | 717/143 |
| 2002/0147721 A1 | * | 10/2002 | Gupta et al. | 707/100 |
| 2004/0193399 A1 | | 9/2004 | Potter et al. | |
| 2004/0258061 A1 | * | 12/2004 | Sahni et al. | 370/389 |
| 2005/0060693 A1 | * | 3/2005 | Robison et al. | 717/143 |
| 2006/0013217 A1 | * | 1/2006 | Datla et al. | 370/389 |
| 2007/0265833 A1 | | 11/2007 | Nakayama | |
| 2008/0235251 A1 | | 9/2008 | Shmueli et al. | |
| 2010/0017397 A1 | | 1/2010 | Koyanagi et al. | |
| 2010/0325588 A1 | | 12/2010 | Reddy et al. | |
| 2011/0153641 A1 | | 6/2011 | Thorup et al. | |
| 2011/0225181 A1 | | 9/2011 | Kubicki et al. | |

OTHER PUBLICATIONS http://stackoverflow.com/questions/260056/hashtable-dictionary-map-lookup-with-regular-expressions, retrieved Nov. 30, 2011.

* cited by examiner

*Primary Examiner* — Tarek Chbouki
(74) *Attorney, Agent, or Firm* — MH2 Technology Law Group, LLP

(57) ABSTRACT

Methods, systems, and computer-readable media for efficiently and flexibly invoking programs or subroutines specified by command terminal input strings using a trie data structure include: receiving a command string; dividing the command string into one or more tokens, wherein the one or more tokens are delimited by whitespace within the command string; identifying a node-path within a trie data structure corresponding to the one or more tokens; extracting a program stored in a final node in the node-path; and executing the program.

17 Claims, 8 Drawing Sheets

311 [user:jadams] > run alpha
System set to alpha mode: all communications permitted
312 [user:jadams] > run gamma
System set to gamma mode: only secured outbound communications permitted
313 [user:jadams] > mail drafts
Error: invalid command
314 [user:jadams] > send mail
Error: invalid command
315 [user:jadams] > send mail drafts
Send successfully executed. You have no more drafts in your mailbox.
316 [user:jadams] > frok 2
Error: invalid command
317 [user:jadams] > fork 2
Fork operation successful: an additional two instances of System.ListenerThread have been spawn

511: `[user:jadams] > frok`
Fork operation successful: an additional instance of System.ListenerThread has been spawn 512: `[user:jadams] > s mail ALL`
Send successfully executed. All messages in outbox have been sent 513: `[user:jadams] > run @ %o1984`
Port 1984 set to alpha mode: all outbound communications permitted 514: `[user:jadams] > exec alpha %1984 -out`
Command ignored: port 1984 has already been set to alpha mode for outbound communications 515: `[user:jadams] > run gamma -port=31 -out=monitored -in=forward -dest=42`
Port 31 set to gamma mode: all outbound communications are now being monitored; inbound communications now forwarded to port 42.

TRIE SPECIALIZATION ALLOWING STORAGE OF VALUE KEYED BY PATTERNS AND RETRIEVAL BY TOKENS

CROSS-REFERENCE TO RELATED APPLICATION

This application claims priority to U.S. Provisional Patent Application No. 61/559,719, filed on Nov. 14, 2011, which is hereby incorporated by reference in its entirety.

TECHNICAL FIELD

The present disclosure relates generally to methods, systems, and computer-readable media for invoking programs or subroutines specified by command strings using data structures.

BACKGROUND

A command terminal, also known as a "shell," is an environment in which a user may instruct a computer system to perform various operations using one or more textual commands. Typically, commands and their argument are formatted in terms one or more white-space delimited words or tokens. Or, a command itself may be structured as a multiple-word sequence.

Command terminals may be difficult to implement for a number of reasons. For example, if the command terminal is to be used to execute a large number of different commands, each of which may accept a variety of different potential arguments, it may be difficult to store all potential command-argument combinations in memory efficiently. It may also be difficult to efficiently match multi-word commands received from users to the specific programs or subroutines associated with such commands.

For example, an input string could be matched to a specific program by comparing the input string to a list of recognized command strings using "if-else" branch statements or a "switch" condition. However, if the total number of command-argument combinations is significant, such code could easily become unwieldy, difficult to maintain, and especially difficult for a third party to extend or modify.

Command terminals may present difficulties from the user side as well. For example, it may be difficult for users to remember specific commands for performing desired actions, especially if the commands include multiple arguments or if the commands are represented by shorter abbreviations that are capable of confusion with similar abbreviations. Users may also become frustrated due to the inflexibility of command terminals. Typically, command terminals are coded so as to perform actions only in response to a user providing an exact match to a command and/or command-argument combination. Thus, even a simple mistake or informality in an entered command may cause the terminal to return an error or to execute the wrong command, adding to user frustration.

Accordingly, command terminals may be improved by techniques that provide for efficient storage and retrieval of programs associated with specific commands and that further provide flexibility to users in entering commands.

SUMMARY

The present disclosure addresses these and other improvements to command terminals. In some embodiments a command terminal may operate by receiving a command string; dividing the command string into one or more tokens, wherein the one or more tokens are delimited by whitespace within the command string; identifying a node-path within a trie data structure corresponding to the one or more tokens; extracting a program stored in a final node in the node-path; and executing the program.

Additional objects, advantages, and embodiments of the present disclosure will be set forth in part in the description that follows, and in part will be derived from the description, or may be learned by practice of the disclosed embodiments. The objects, advantages, and embodiments of the present disclosure will be realized and attained by means of the elements and combinations particularly pointed out in the appended claims. It is to be understood that both the foregoing general description and the following detailed description are exemplary and explanatory only and are not restrictive of the present disclosure, as claimed. It is also to be understood that use of the word "exemplary" throughout the application is to be understood as providing examples that may be useful for illustrating general principles or concepts; thus, figures and descriptions identified as "exemplary" should not be interpreted as representing the best or only approaches to practicing the disclosed embodiments.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1:
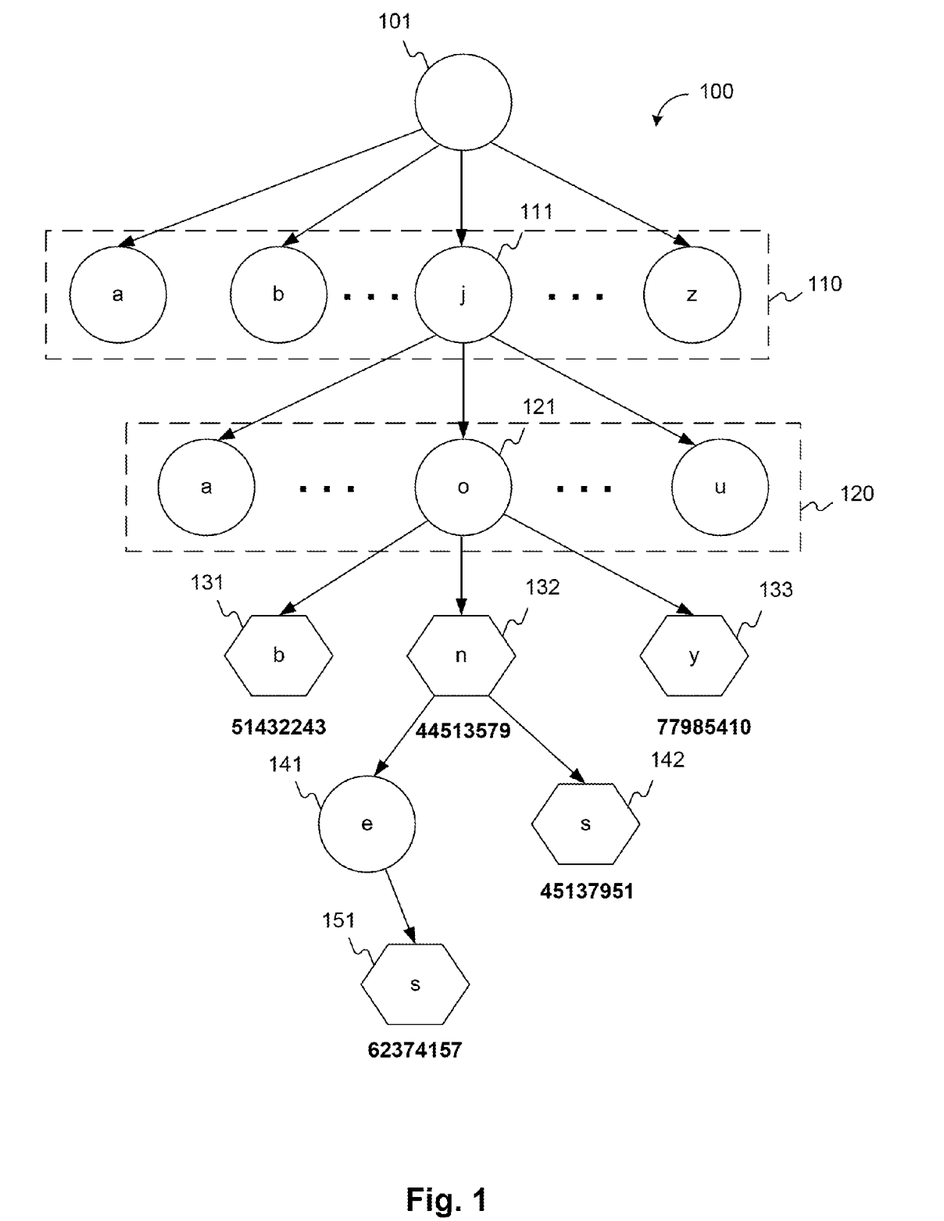
FIG. 1 is a diagram depicting an exemplary trie data structure, consistent with certain disclosed embodiments.

In some embodiments, the present disclosure provides for the efficient storage, retrieval, and execution of command line inputs using one or more modified hierarchical data structures. FIG. 1 is a diagram depicting an exemplary trie data structure, consistent with certain disclosed embodiments.

As depicted in FIG. 1, a trie data structure (hereinafter, simply "trie") 100 may be represented conceptually or in memory as a tree structure in which values associated with keys are located by incrementally traversing a path of nodes corresponding to the sequence of characters in a key. As an example, FIG. 1 represents a conventional trie that may be used to look up employee ID numbers (values) using employee surnames (keys). Trie 100 begins with a root node 101, having no key data. Root node 101 is linked to a series of child nodes 110, each of which include a single character as a key. Any one of child nodes 110 may, itself be associated with one or more child nodes of its own. For example, as depicted in FIG. 1, node 111 is linked to a series of child nodes 120, including a child node 121 that itself has child nodes 131-133, etc.

Within trie 100, each node, with the exception of root node 101, may include a single character as key data. Additionally, one or more nodes may include a value. In FIG. 1, for purposes of illustration, nodes that contain a value are depicted as hexagons, whereas nodes without values are depicted as circles or ellipses. In some implementations, all nodes that do not have child nodes, also known as "leaf" nodes, contain values, whereas intermediate nodes may or may not have values. FIG. 1 depicts only an excerpt of trie 100; thus, the child nodes of some non-leaf nodes (represented as circles), are not depicted.

In some implementations, it may be determined whether trie 100 has a value associated with a particular search key by determining whether there is a node-path corresponding to the sequence of characters in the search key. For example, as can be seen in FIG. 1, the value associated with the search key 'jones' may be located by traversing a path that includes the nodes 111, 121, 132, 141, and 151, respectively, each of which contains a lookup key corresponding to the next character in the search key. Once a node corresponding to the final character of the search key has been found within trie 100—here, node 151—the value associated with that node may be retrieved and identified as the value associated with the search key itself.

If trie 100 does not contain a node-path that matches a search key, or if the final node in a path that matches the search key does not contain a value, then it may be determined that trie 100 does not have a value associated with the search key. For example, with respect to the search key 'jobs', it can be seen that although a node-path exists for the key 'job' (i.e., node-path 111, 121, and 131, respectively), node 131 does not have any child node that includes the letter 's' as a lookup key. Thus, a search for 'jobs' within trie 100 will fail, and no value will be returned. Similarly, although a node-path exists for the search key 'jone', node 141, which matches the final character in the search key, does not contain a value. Thus, a search for 'jone' within trie 100 will fail, and no value will be returned.

In the present disclosure, the trie data structure may be expanded or modified in several ways to implement an efficient and flexible command terminal. Each of these modifications will now be discussed. It is to be understood that each of the below-described modifications may be employed separately or interdependently with other modifications. Thus, the present disclosure is not limited to any one modification or combination of modifications.

Tokenized Trie Structure Lookup Keys

As a first modification, multi-word command/argument combinations may be stored in a trie data structure such that it may be determined whether a user has entered a valid command string by determining whether a trie node-path exists for the sequence of words in the command string. An exemplary implementation of this technique is depicted in FIG. 2, which presents an exemplary modified trie 200.

Figure 2:
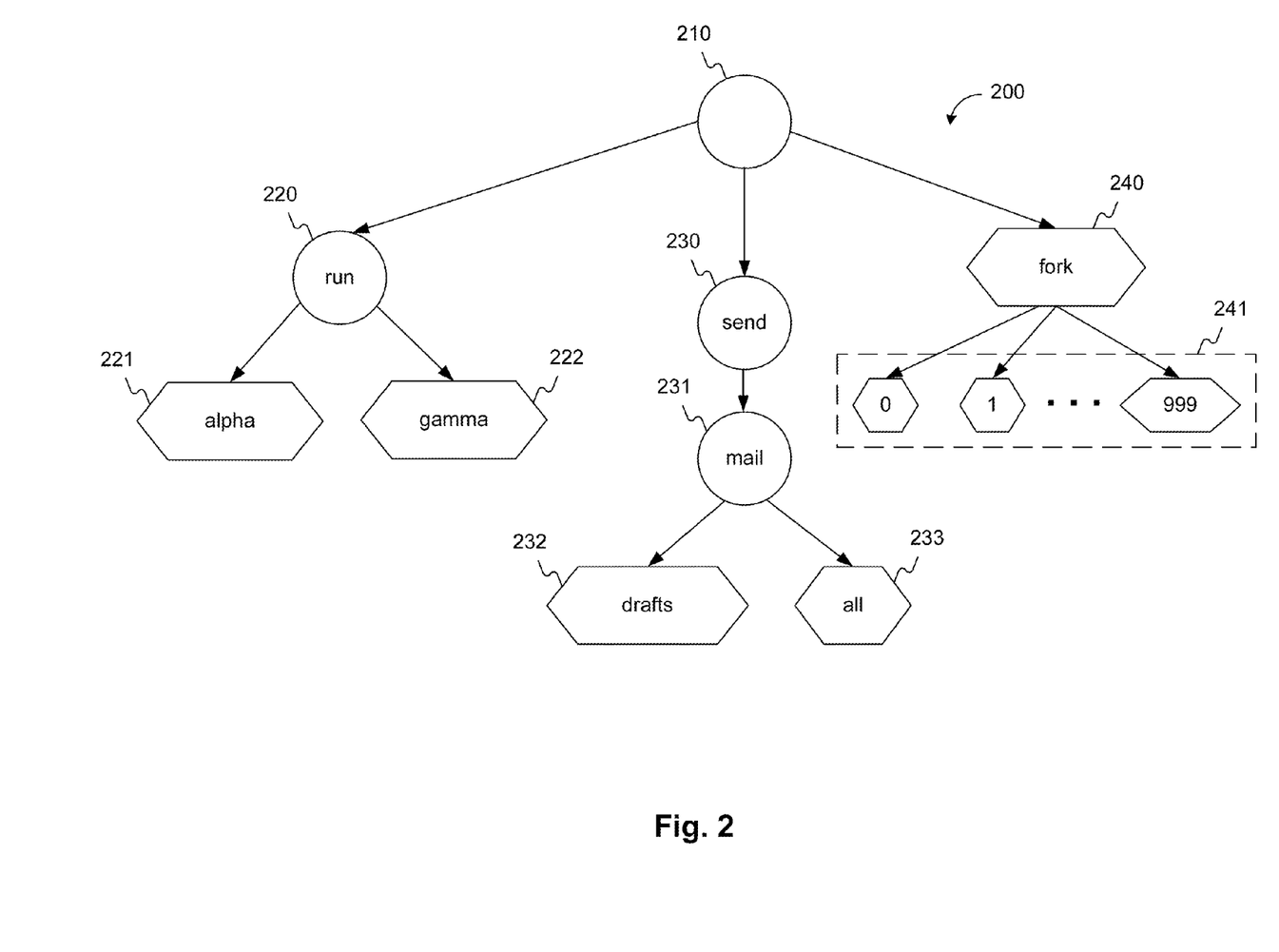
FIG. 2 is a diagram depicting an exemplary trie data structure for implementing a command terminal using tokenized lookup keys and stored program values, consistent with certain disclosed embodiments.

As depicted in FIG. 2, similar to trie 100, the 200 includes a root node 210, having no key data, and a number of descendant nodes that proceed from root node 210 in a tree-like manner. However, unlike trie 100, in the 200, the lookup keys in non-root nodes are not confined merely to single characters, but may instead be multi-character words. As stated above, it may be determined whether a user has entered a valid command by determining whether a trie node-path exists for the sequence of words in the command input string. Exemplary commands that may be interpreted using trie 200 are depicted in FIG. 3.

Figure 3:
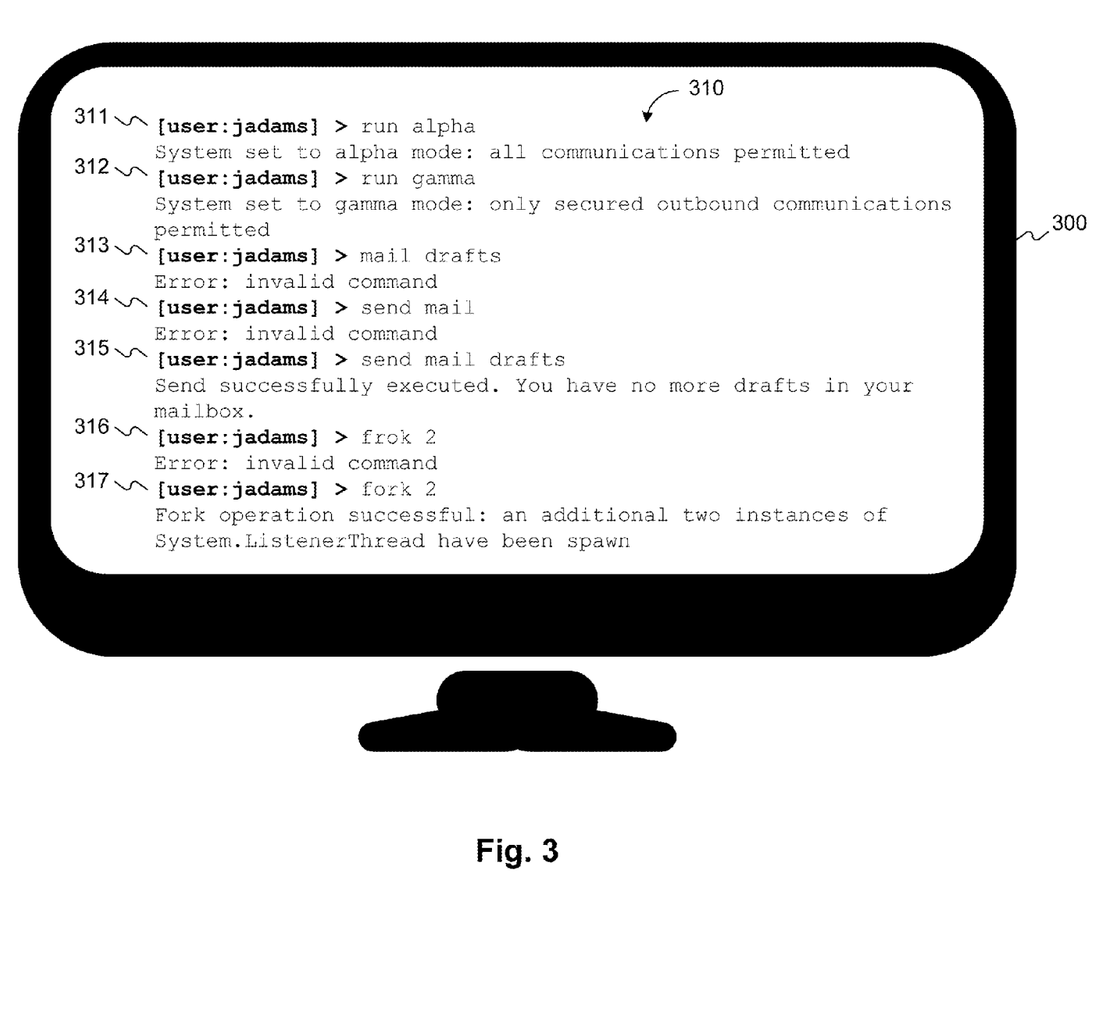
FIG. 3 is a diagram depicting exemplary command terminal inputs and outputs using a command terminal, consistent with certain disclosed embodiments.

As depicted in FIG. 3, a computing system 300 may run a command terminal 310 that accepts and executes commands received from a user or other program. Command terminal 310 may interpret and execute commands using trie 200. As a first input, a user has entered a command 311 "run alpha", which consists of two words separated by whitespace. In command 311, the word "run" may correspond to an executable program or subroutine, and the word "alpha" may correspond to an argument recognized by the program; alternatively, the combination of the words "run" and "alpha" may itself correspond to a program resident in computing system 300. Thus, throughout this application, multi-word input strings, such as input 311, will be referred to as simply "commands," whether they consist of a multi-word command or a command word followed by one or more argument words.

Upon receiving command 311 as an input string, command terminal 310 (e.g., executing on computing system 300) may first divide or "tokenize" the input string into constituent word tokens using whitespace as a delimiter. Then, command terminal 310 may consult trie 200 to determine whether a node-path exists for sequence tokens in the input string. Here, it can be seen that first-level node 220 contains the word "run" as a lookup key, and an immediate child node 221 contains the word "alpha" as a lookup key.

Thus, command terminal 310 can quickly and easily determine that the input string "run alpha" matches a valid command. And, as depicted in FIG. 3, computing system 300 may execute the associated program or subroutine, and command terminal 310 may output a result or message associated with the executed program. In a similar manner, command terminal 310 may receive command 312, and may determine that a node-path exists for the lookup keys "run" and "gamma"—here, nodes 220 and 222, respectively. Thus, command terminal 310 and/or computing system 300 may execute the program or subroutine associated with command 312, and may output a result or message associated with the executed program.

By contrast, as depicted in FIG. 3, commands 313 and 314 may not be recognized as valid commands. With respect to command 313, although a node-path exists for the tokens "mail" and "drafts"—here, nodes 231 and 232, respectively—the first token does not match any first-level node in trie 200, but matches only a second-level node. Thus, command 313 does not match any node-path in trie 200 that begins with a first-level node or, put differently, that proceeds from the top of trie 200, beginning at root node 210.

With respect to command 314, a node-path does exist for the tokens "send" and "mail"—here, nodes 230 and 231, respectively—and that node-path is a valid node-path by virtue of proceeding from root node 210. However, as depicted in FIG. 2, the node-path associated with command 314 terminates at a node that does not contain a value (as represented by circle, rather than a hexagon). Thus, trie 200 does not store any program associated with command 314, and command terminal 310 may output an error accordingly.

Objects as Node Values

As a second modification to trie 100, nodes that contain values in trie 200 may store not simply strings or integers as values, but executable programs. In some embodiments, such programs may be stored in trie 200 as programming language objects having one or more methods or subroutines. For example, each node value in trie 200 may be a Java™ object that contains a non-private method that, when called by a virtual machine or other execution process, performs the function associated with command input.

In some embodiments, to provide a standard interface for calling such methods, each Java object may be instantiated from a Java class that implements the Java Runnable interface. The Java Runnable interface, which is typically used to create threads within a Java program, specifies that any implementing class define a method named "run", which is automatically called upon the spawning of the thread. Here, executable programs associated with commands may be stored as objects instantiated from Java classes that implement the Runnable interface, and code for performing the operations associated with the command may be placed in the "run" method.

Using this approach, once command terminal 310 reaches the final node in a node-path corresponding to a particular command, command terminal 310 may execute the code necessary to perform the command by simply calling the "run" method in the Java object stored at that final node. By ensuring that each node value is stored as a Runnable object, command terminal 310 may execute each stored program in the same manner, without having to "know" any details specific to any particular program. Those skilled in the art will appreciate that the foregoing technique for storing programs as node values within trie 200 is exemplary only and that other techniques may be used.

Regular Expressions as Lookup Keys

As described in the background section, one of the problems associated with conventional command terminals is that, if a command terminal supports a large number of different commands/arguments, it may be difficult for users to remember specific word sequences for some commands. This problem may be especially acute for commands or arguments that are short character sequences that are not immediately recognizable as acronyms or abbreviations. For example, the UNIX™ command "ls", which instructs a command terminal to list the contents of a current file system directory, may not be immediately recognizable or mnemonically associable with the word "list," from which it is derived.

In some environments, commands may be mapped to longer, more descriptive names to reduce the likelihood of confusion with other commands. For example, the UNIX command "ls-la", which instructs a command terminal to list the full details of all files (including hidden files) in a directory, could hypothetically be represented by the command string "list_directory_contents-all_files" instead. However, not only would such longer commands be more tedious and time-consuming for users to type, but their length might result in frequent mistakes.

Typically, command terminals are configured to perform literal string matching between user-provided input strings and recognized command strings, thus imposing a zero-tolerance policy for user mistakes when entering commands. For example, as depicted in FIG. 3, a user may input command 316, which represents an accidental mistyping of a valid command 317. Although invalid command 316 closely resembles valid command 317, because no first-level node in trie 200 contains the word "frok", command terminal 310 will output an error despite the similarity.

Therefore, to ameliorate the above-described problems, as well as other shortcomings of conventional command terminals, a third modification may involve allowing nodes in a command trie, such as trie 200, to include lookup keys that may be more flexibly matched instead of simple character-by-character equivalence. In some embodiments, such flexible lookup keys may be structured as regular expressions. As known by those skilled in the art, regular expressions are text strings that may include both literal characters and control characters or operators that denote sets of strings and operations over those sets.

For example, whereas a literal match pattern "abc" may match only an identical sequence of characters "abc", the regular expression match pattern "a*bc" may match a number of potentially different character sequences, including "abc", "aaabc", "be", and others. In the previous example, the control character "*" indicates that the regular expression may match a text string if it has zero or more of the preceding character—here, "a"—provided that the text string includes the literal characters "be" in that order. If the control character "+" is instead used, the regular expression may match a text string if it has one or more "a" characters followed by "bc".

Different programming languages may designate different characters as operators, and may provide different rules for how such operators may be used to match text strings. For purposes of illustration in this application, a regular expression syntax similar to that of the Perl programming language will be used. Table 1 below further provides a mapping of operators to functions for the regular expression examples used in this application.

TABLE 1

| | Exemplary Regular Expression Operators/Control Characters |
|---|---|
| \ | Escape flag: converts a subsequent control character to a literal character for matching. |
| \d | Matches any character that is a digit. |
| \D | Matches any character that is not a digit. |
| * | Matches zero or more of the preceding character or expression. |
| + | Matches one or more of the preceding character or expression. |
| ? | Matches zero or one of the preceding character or expression. |
| {n} | Matches exactly n occurrences of the preceding character or expression, where n is an integer. |
| {n,} | Matches n or more occurrences of the preceding character or expression. |
| {n,o} | Matches between n and o occurrences of the preceding character or expression (inclusive). |
| . | Matches any character except a new line or carriage-return character. |
| a\|b | Alternation: matches the character or expression on either side of the pipe character—here, either character 'a' or 'b'. |
| (abc) | Grouping: matches the group of characters contained in the parentheses—here, the characters 'abc'—and lumps the characters together as an expression. |

TABLE 1-continued

Exemplary Regular Expression Operators/Control Characters

| | |
|---|---|
| [aA@] | Permissible character group: matches any character contained in the brackets. |
| [a-q] | Permissible character range: matches any character in the specified range—here, between 'a' and 'q'—as ordered by underlying ASCII or Unicode binary representation, for example. |
| i/ | Sensitivity modifier: subsequent regular expression may match text strings in a case-insensitive manner. |

Figure 4:
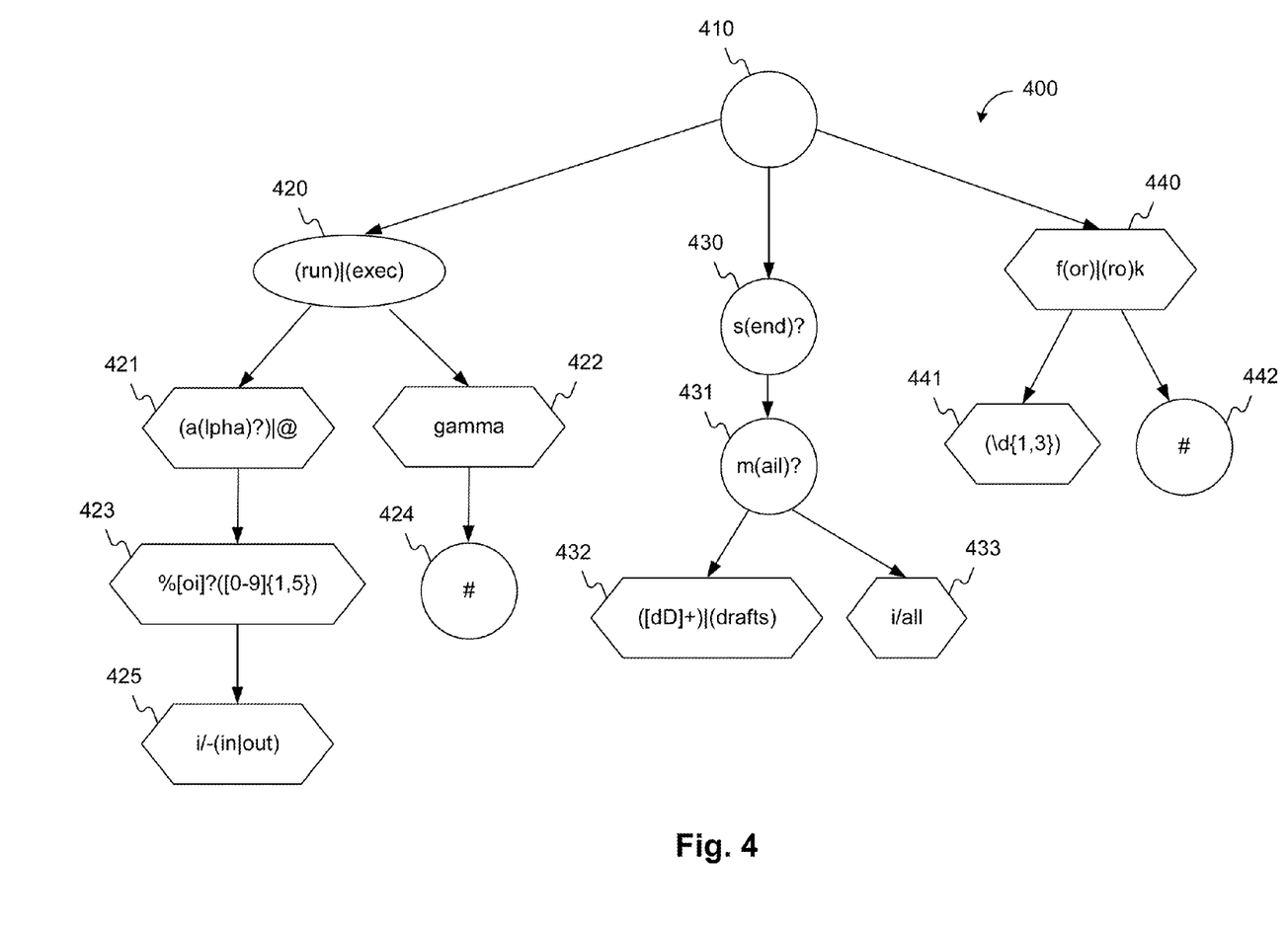
FIG. 4 is a diagram depicting an exemplary trie data structure for implementing a command terminal using tokenized, regular expression lookup keys, wildcard trie nodes, and stored program values, consistent with certain disclosed embodiments.
Figure 5:
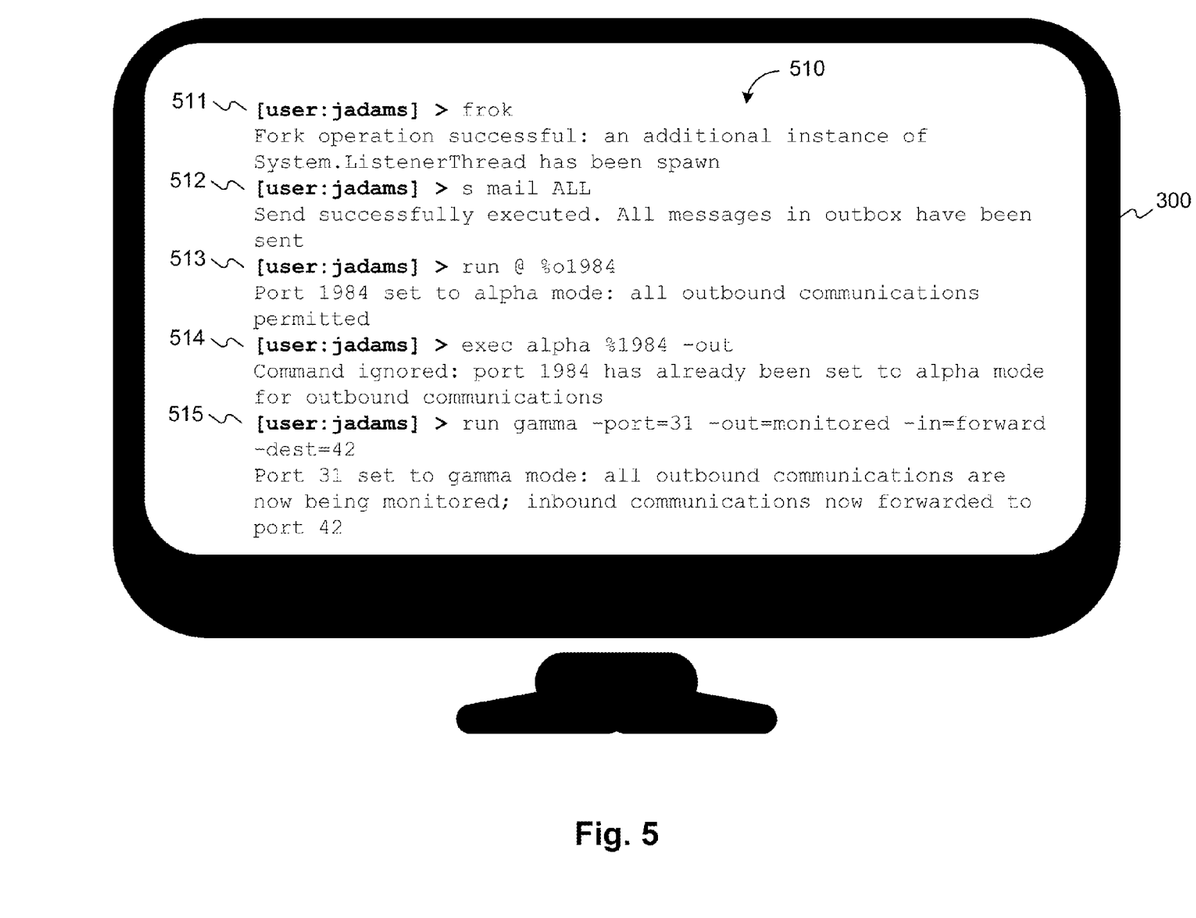
FIG. 5 is a diagram depicting exemplary command terminal inputs and outputs using a command terminal, consistent with certain disclosed embodiments.

FIG. 4 is a diagram depicting an exemplary command trie data structure in which various nodes contain regular expressions as lookup keys. As depicted in FIG. 4, a command trie 400 has been constructed that is similar in nature to trie 200 by virtue of containing tokenized lookup keys in its nodes. However, unlike trie 200, the nodes in trie 400 may contain lookup keys that are either literal string words or regular expressions that may be used to more flexibly match similar command words. FIG. 5 depicts various examples of commands that may be executed by a command terminal 510 that uses trie 400 to locate and execute commands. By utilizing regular expressions as lookup keys, command terminal 510 provides several improvements over terminal 310 in terms of flexibility and ease of use.

One improvement concerns command terminal 510's flexibility to recognize and compensate for potential mistakes in user-provided commands. For example, command 511 represents an accidental misspelling of the command "fork" by a user. However, because hie 400 contains a regular expression lookup key that matches both "fork" and the "frok" misspelling (i.e., node 440), command terminal 510 may return or execute the program associated with node 440, rather than returning an error.

As another improvement, the use of regular expressions can enable users to enter abbreviated command words in place of longer command words. For example, because the regular expression lookup key in node 430 allows a user to optionally omit all but the first letter of the word "send", a user may enter command 512 as a valid command. The ability to use such abbreviated commands can greatly improve the speed and ease with which users can type valid commands into command terminal 510, especially when an abbreviation may be used in place of a full, literal command that is lengthy or that the user needs to type frequently.

As another improvement, the use of regular expressions can enable command terminal 510 to accept a number of synonyms or different syntaxes as valid inputs for the same command. For example, as depicted in FIG. 4, the regular expression lookup key for node 420 can match either the word "run" or the word "exec". Thus, if a user is unsure of the exact word for a particular command, terminal 510 allows the user to enter a best guess as to the command word, and if the guessed word is a synonym of the correct command, as reflected in a regular expression lookup key, the command will execute as the user desires.

Similarly, regular expression lookup keys can allow the same program to be executed using different command syntaxes. For example, in node 423, the regular expression lookup key requires a one-to-five digit port number to be supplied, but also includes an optional preceding "o" or "i" character with which a user can specify whether the command pertains to inbound or outbound communications. Alternatively, the user may omit the preceding letter character in node 423 and may instead specify the same parameter using a subsequent "in" or "out" argument, as defined by the lookup key in child node 424. As a result, as depicted in FIG. 5, commands 513 and 514, which have different syntaxes, can be used to execute the same program. This type of syntax flexibility may be useful for users who prefer to place different command parameters in separate tokens (e.g., for readability) or for writing code that dynamically builds command strings by incrementally adding tokens according to branch or loop conditions.

As yet another improvement, the use of regular expressions can reduce the number of individual nodes that must be added to a command trie to match all possible command words or arguments. For example, in trie 200, because the "fork" command of node 240 may accept a numerical argument ranging from 0 to 999, the use of only literal word strings as lookup keys may require a thousand separate child nodes 241 to be created and branched off of node 240. This approach might not only greatly increase the size of trie 200 in memory, but might also be impractical for manually created command-node mappings by a user.

However, the need to create a separate child node for each possible command argument can be obviated by the appropriate use of regular expressions as lookup keys that can flexibly match all such valid arguments. For example, in contrast to the thousand child nodes 241 of node 240, node 440 has a single child node 441 that is capable of matching all thousand possible arguments. In particular, this result is accomplished by including a regular expression lookup key in node 441 that can match any one-to-three digit sequence.

Determining Match Strings Using Capture Groups

Thus, the use of regular expressions as lookup keys provides trie 400 with significant flexibility to match a large variety of different input strings—including typographical mistakes, abbreviations, synonyms, alternative syntaxes, etc.—with valid commands. One potential drawback to this approach, however, is that, in some cases, it may be necessary to determine precisely which command word or argument a user entered in order to execute the appropriate associated program.

For example, the commands "fork 1" and "fork 2" should result in different sets of operations being performed—that is, "fork 1" should result in one additional instance of a thread being spawned, whereas "fork 2" should in two additional instances of the thread being spawned. However, because both commands will match the same node-path—here, node-path 440-441—it may be insufficient to simply invoke the same program value stored in node 441 in an identical manner for both commands. Rather, the program should be invoked differently depending on the contents of the matching token in the input string.

Therefore, a fourth modification may involve using capture groups to determine which character sequences in an input string were matched by certain regular expression lookup keys. As known by those skilled in the art, a capture group may be a group of literal characters or control characters in a regular expression that is contained with parentheses. Whereas the basic use of regular expressions is to determine whether or not a match has occurred—a binary determination—capture groups expand the functionality of regular expressions by allowing computer code to determine how the match occurred and to potentially take subsequent action with respect to one or more matching parts.

For example, in the regular expression "b(a*)d", the parentheses specify the zero or more instances of "a" as a capture group. Thus, if the regular expression is found to match the strings "bd", "bad", and "abcbaaad", then the matching operation may return the strings " ", "a", and "aaa" as the respective capture results in the matches. Capture groups may further be nested in a regular expression—for example, "(b (a*)d)"—which can result in multiple strings being returned as capture results for a given match. In some cases, results for capture groups may be returned, even if the regular expression as a whole is not found to match any text, provided that at least one match for a capture group within the regular expression is found. Those skilled in the art will appreciate the full extent to which capture groups may be used in standard programming practices, such as the uses defined in the Perl programming language.

Terminal 510 may therefore be modified to not only determine whether an input string matches a valid node-path in trie 400, but to also analyze certain capture group results that may be returned when comparing regular expression lookup keys to command word tokens. For example, the command "fork 2" will be found to match nodes 440 and 441, respectively. Because of the capture groups specified in nodes 440 and 441, the match operations should return capture results "or" and "2", respectively. In node 440, parentheses have been used only to group characters together in an expression for alternation purposes, and therefore the capture result can be ignored. However, the numerical value that matches node 441 may be important for determining how many thread instances to spawn; therefore, command terminal 510 may use the returned capture result "2" to execute the program associated with node 441 such that it will spawn the correct number of threads.

Similar uses of capture results may be made for nodes 423 and 425, in which the matching character sequence may alter how the associated node program is performed. For example, command terminal 510 may pass certain capture results as arguments to the executed program. Alternatively, nodes may store a plurality of different programs as values, and may select the appropriate program based on a returned capture result. Those skilled in the art will appreciate that the foregoing uses of capture results are exemplary only, as other uses may be made to expand the functionality of command terminal 510.

Handling Collisions Between Regular Expression Lookup Keys

Although the use of regular expression lookup keys can greatly expand the number of different input strings that can match a given command, such added flexibility may occasionally result in collisions between different node lookup keys. Such collisions may be particularly common if command terminal 510 allows users or third-party developers to add nodes to trie 400 and to specify associated node lookup keys.

For example, as depicted in FIG. 4, the lookup key stored in node 430 may allow even a single character—"s"—to function as an abbreviation for the "send" command. However, another party may add another first-level node to trie 400—e.g., for a "suspend" command—and that party out, of a desire to provide maximum matching flexibility, could also specify a regular expression lookup key capable of matching a single "s" character. If a user subsequently enters the character "s" as a first command word in an input string, a search through trie 400 may result in two matching first-level nodes, a result that is typically not permitted in trie structures.

Such collisions could be eliminated by enforcing a policy that any new nodes added to trie 400 not contain lookup keys that could potentially conflict with other sibling lookup keys. However, this approach may be computationally expensive, and may enable older nodes in trie 400 to usurp a disproportionate matching space relative to newer nodes. Therefore, a fifth modification may involve interactively prompting a user for selection of the correct command in the event of a conflict. For example, if the user enters only the character "s" as a command, terminal 510 could notify the user that both the "send" and the "suspend" commands match the user's input string and could prompt the user to select the command that the user had intended. Nodes in trie 400 may optionally include a single, canonical string that uniquely identifies the command, which could be provided as part of the prompt.

Alternatively, conflicts at higher-level nodes may be resolved without user input by determining whether only a single node-path exists when lower-level nodes are taken into account. For example, the first token in the input string "s mail D" may match both the "send" and "suspend" lookup keys in the first-level nodes in this example. However, if the first-level node for the "suspend" command does not have any child nodes that match the second token—here, "mail"—then command terminal 510 may infer that the user intended to invoke the "send" command on account of the full node-path match. If more than one valid node-path exists to different terminal nodes, then the user may be prompted as described above.

As yet another alternative, nodes within trie 400 may have different priority values such that a conflict between two sibling nodes is always or usually resolved in favor of the sibling node having a higher priority. For example, nodes in trie 400 may automatically have priorities ordered according to the time that they were inserted into trie 400, whether higher or lower, or nodes could be assigned priorities when they are inserted.

Third-Party Extension of Commands Using Wildcards as Lookup Keys

As a sixth modification, in some embodiments, rather than containing a literal character string or a regular expression as a lookup key, a leaf node may include a wildcard that is capable of matching any subsequent command tokens. For example, as depicted in FIG. 4, leaf nodes 424 and 442 contain wildcards as lookup keys—here, in the form of a hash character. In this implementation, the hash character may be specially recognized as a wildcard when comparing trie node lookup keys to command tokens, and an escape flag may be used if a lookup key is intended to match an actual hash character in an input string. In other implementations, other control characters or sequences may be used to indicate a wildcard, or an empty string or null value may be used instead.

As stated above, a node that contains a wildcard as a lookup key may match any token subsequent to the token that matched a parent node. For example, command 515 may be recognized as a valid command on account of its first and second tokens matching nodes 420 and 422, respectively, and all of its remaining tokens matching the wildcard in node 424.

In some embodiments, the remaining tokens may be discarded, and the program stored in node 422 or node 424 may be executed. Here, node 424 is depicted as a circle—thus, lacking a program value—however, in some cases, wildcard nodes may also have associated programs—for example, to enforce a policy of requiring all leaf nodes to contain program values. In other embodiments, any remaining tokens may be passed to the executed program as arguments. Thus, in this example, the tokens "-port=31-out=monitored-in=forward-dest=42" would be passed to the program associated with node 422 or 424.

By passing any wildcard-matched tokens to an executed program, the program developer may extend the functionality of a command stored in trie 400. For example, the developer may design the program to accept additional, potentially more complex, arguments that would not be recognized by trie 400 or that would be difficult to incorporate into trie 400 due to syntax, argument-reordering, or simply a desire to abstract certain functionality away from the "knowledge" of trie 400. Those skilled in the art will appreciate that there may be other reasons to extend the functionality of trie 400 by allowing users to specify additional, wildcard-matched parameters or arguments.

In some embodiments, the ability to pass in arguments to a program stored as a value within a trie node may require modifications to the class or interface associated with the stored object. For example, as described above, in some implementations, programs may be stored as values in trie nodes in the form of Java objects instantiated from classes that implement the Runnable interface. However, because the "run" method defined in the Runnable interface does not accept any arguments, in some implementations, an extension of the Runnable interface may be created that overrides the "run" method to accept one or more arguments, or to accept a data structure, such as an array, that may contain an arbitrary number of arguments.

Programs may then be stored as values in trie nodes by creating classes that implement the extended Runnable interface, placing program code in the overridden "run" method that is operable over any arguments passed in as additional wildcard-matched command tokens, and instantiating objects from such classes. Those skilled in the art will appreciate that the foregoing technique for storing programs in trie nodes that are capable of accepting additional arguments is exemplary only.

Third-Party Extension of Commands Using Subclassing

As a seventh modification, a third-party developer could extend the functionality of trie 400 and/or terminal 510 using class extension. For example, terminal 510 could be implemented using a Java (or other programming language) class, and could include trie 400 as a public or protected field. Using this technique, a third-party developer could extend the class and thereby obtain read/write access to the trie data structure. The developer could then expand the functionality of terminal 510 by adding additional nodes to trie 400 or specifying different rules for how input commands are to be matched to trie node-paths.

For example, the developer could modify trie 400 to allow for re-ordering of arguments by determining whether a valid node-path exists for different permutations of the tokens in an input command. Those skilled in the art will appreciate that the behavior of terminal 510 and/or trie 400 may be modified or extended in other ways using subclassing or other types of object-oriented inheritance or extension.

User-Defined Regular Expressions

As an eighth modification, terminal 510 may provide functionality for allowing users to specify different or additional regular expressions for commands through command terminal 510 itself. For example, if a user types a particular command or command sequence frequently, the user may desire to reduce the typing burden by specifying an abbreviation or alias for the command. In some embodiments, terminal 510 may allow users to enter a command, such as "alias 'send mail drafts' 'smd'" to create such an alias.

In this example, terminal 510 may execute the "alias" command by creating a new first-level node that includes the string "smd" as a lookup key and the program associated with node 432 as a value. Thus, in this example, the user may specify a single-token command as an alias of a multi-token command; however, this technique may also be used to create aliases that have two or more tokens. Using this technique, the user may also specify an alias in the form of a regular expression—e.g., "i/s?md"—and lookup/matching operations may be performed using one or more of the techniques described above.

Exemplary Process Flowchart

Figure 6A:
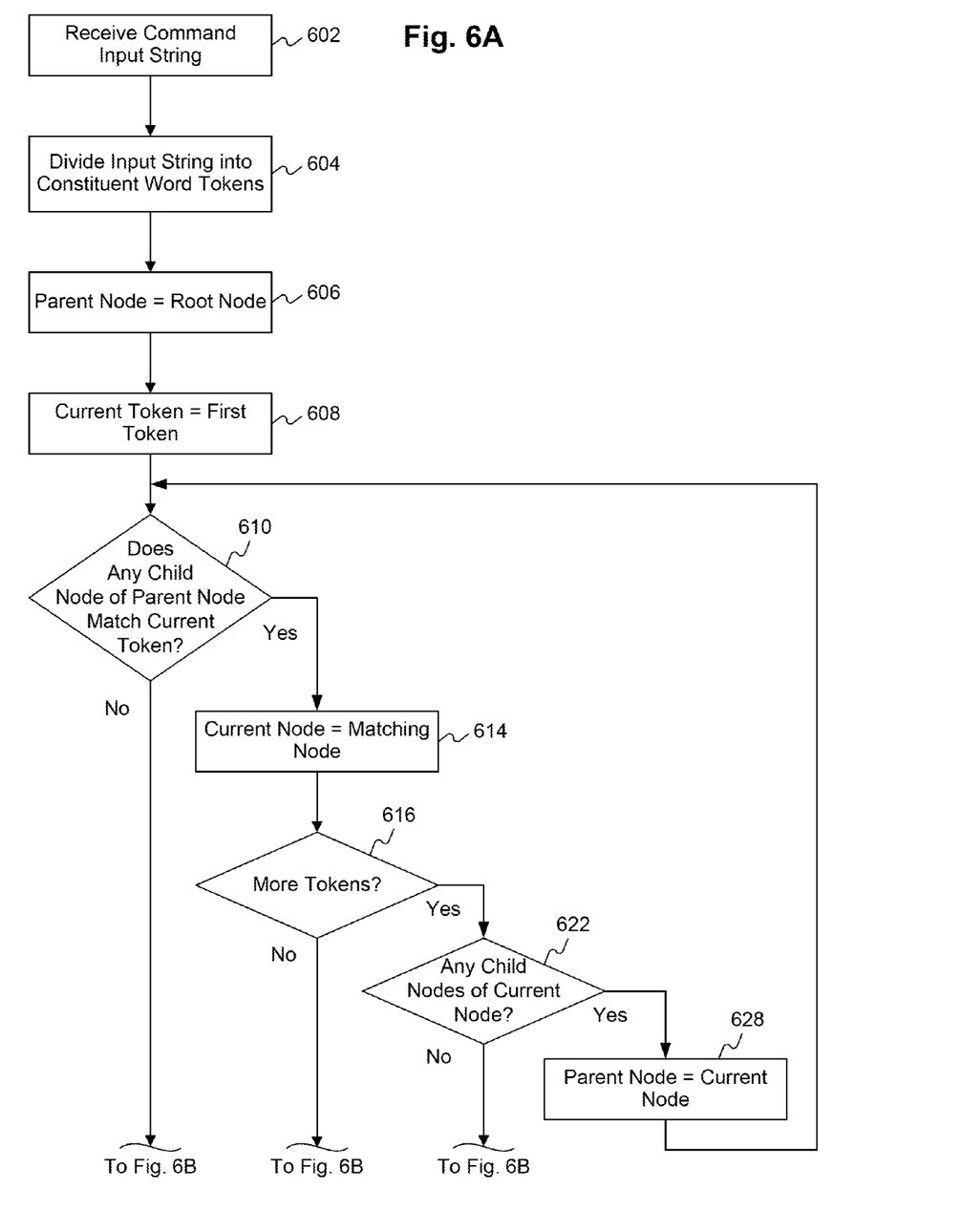
FIG. 6A is a flow diagram depicting an exemplary method of implementing a command terminal using a trie data structure, consistent with certain disclosed embodiments.
Figure 6B:
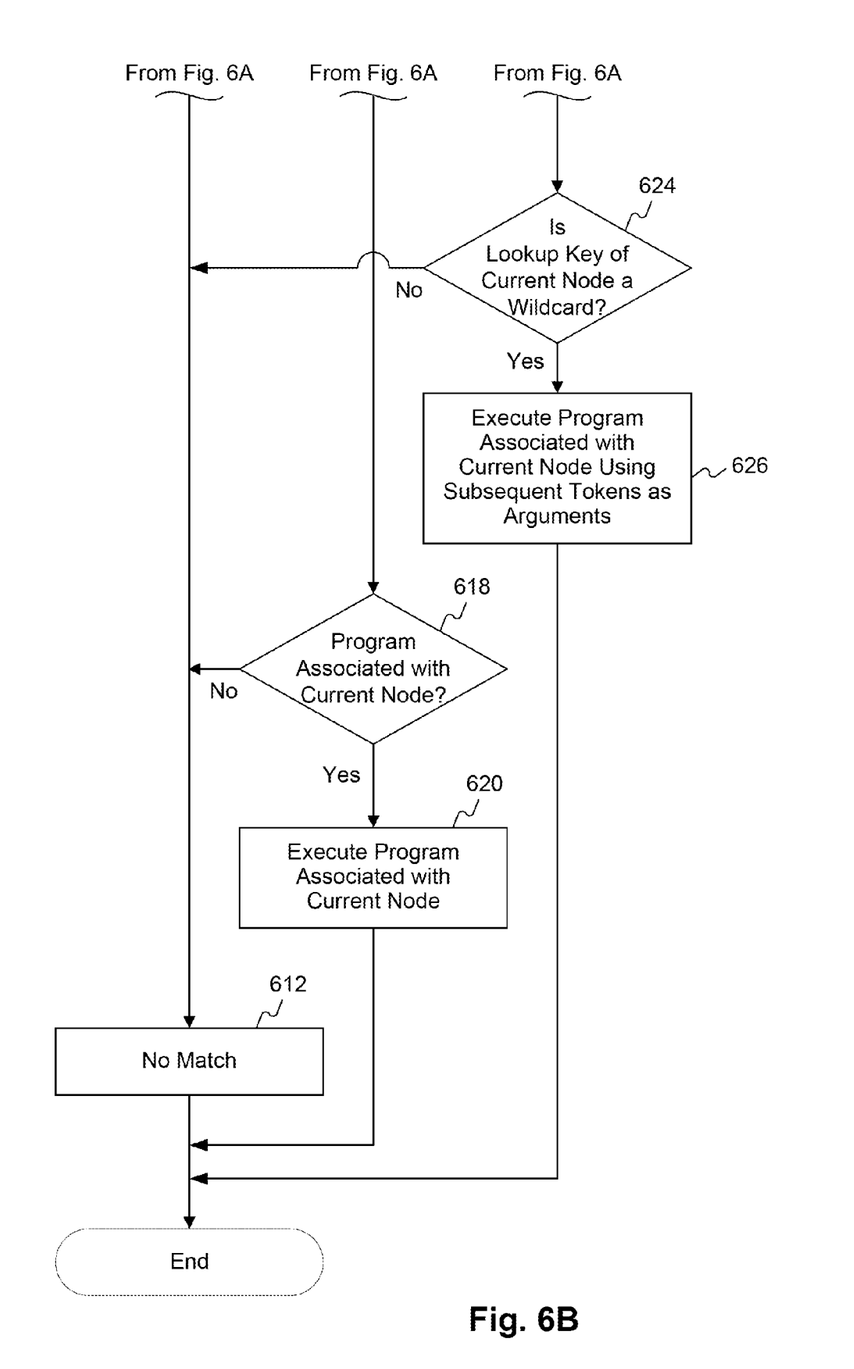
FIG. 6B is a flow diagram depicting an exemplary method of implementing a command terminal using a trie data structure, consistent with certain disclosed embodiments.

FIGS. 6A and 6B are flow diagrams depicting an exemplary process that may be used to perform one or more of the above-described embodiments and/or modifications.

FIGS. 6A and 6B depict operations that may be performed by command terminal 510 when executing on computing system 300.

In step 602, command terminal 510 may receive a command in the form of an input string that terminates with a newline and/or carriage-return character. In step 604, command terminal 510 may divide the input string into one or more tokens. For example, tokens may correspond to whitespace-delimited words.

Command terminal 510 may then traverse a command trie data structure, such as trie 400, to determine whether a valid node-path exists for the token sequence in the received command. Thus, command terminal 510 may establish the root node of the trie as the parent node and the first token in the command as the current token, for purposes of traversal (steps 606 and 608, respectively).

Next, it may be determined whether any child node of the parent node matches the current token (step 610). In particular, command terminal 510 may determine whether the lookup key stored in any immediate child node matches the current token. As described above, such matching may be performed as simple string matching or as regular expression matching.

If a matching child node is not found (step 610, No), then it may be determined that no program stored in trie 400 matches the input string command (step 612), and processing may terminate. If, however, a matching child node is found (step 610, Yes), then, for traversal purposes, the matching node may be identified as the current node (step 614).

At this point, the next step may depend on whether the current token is the final token in the input string. Therefore, in step 616, it may be determined whether there are any more tokens in the input string subsequent to the current token. If there are no more tokens and the current token is the final token (step 616, No), then it may be determined whether the current node (which matches the final token in the input string) stores or is otherwise associated with a program (step 618).

If no program is associated with the current node (step 618, No), then it may be determined that no program stored in trie 400 matches the input string command (step 612), and processing may terminate. If however, a program is associated with the current node (step 618, Yes), then terminal 510 may retrieve that program from the current node and may execute it (step 620). Thus, the input string has been matched to a valid command sequence, resulting in execution of the desired program. Processing may then terminate.

Returning to step 616, if the input string includes one or more additional, subsequent tokens (step 616, Yes), then additional nodes in trie 400 may need to be traversed. Thus, in step 622, it may be determined whether the current node has any child nodes. If the current node does not have any child nodes (step 622, No)—e.g., the current node is a leaf node—then subsequent action may depend on whether the current node stores a literal string or regular expression as a lookup key or stores a wildcard as a lookup key.

If the lookup key of the current node is not a wildcard (step 624, No), then a mismatch has occurred. Terminal 510 has reached a final leaf node in trie 400 before exhausting all tokens in the input string. As a result, it may be determined that no program stored in trie 400 matches the input string command (step 612), and processing may terminate. If, however, the current node has a wildcard as a lookup key (step 624, Yes), then terminal 510 may execute the program associated with the current node, and may pass the remaining tokens to the executed program as arguments (step 626). Processing may then terminate.

Returning to step 622, if the current node does have child nodes (step 622, Yes), then both additional tokens in the input string and additional further descendant nodes for traversal remain. Therefore, in step 628, the current node may become the new parent node, for traversal purposes, and processing may return to step 610. Some of steps 610 through 628 may repeat until either a matching program is executed or no matching node-path is found. Those skilled in the art will appreciate that foregoing processing steps are exemplary only.

Exemplary Hardware Configuration

Figure 7:
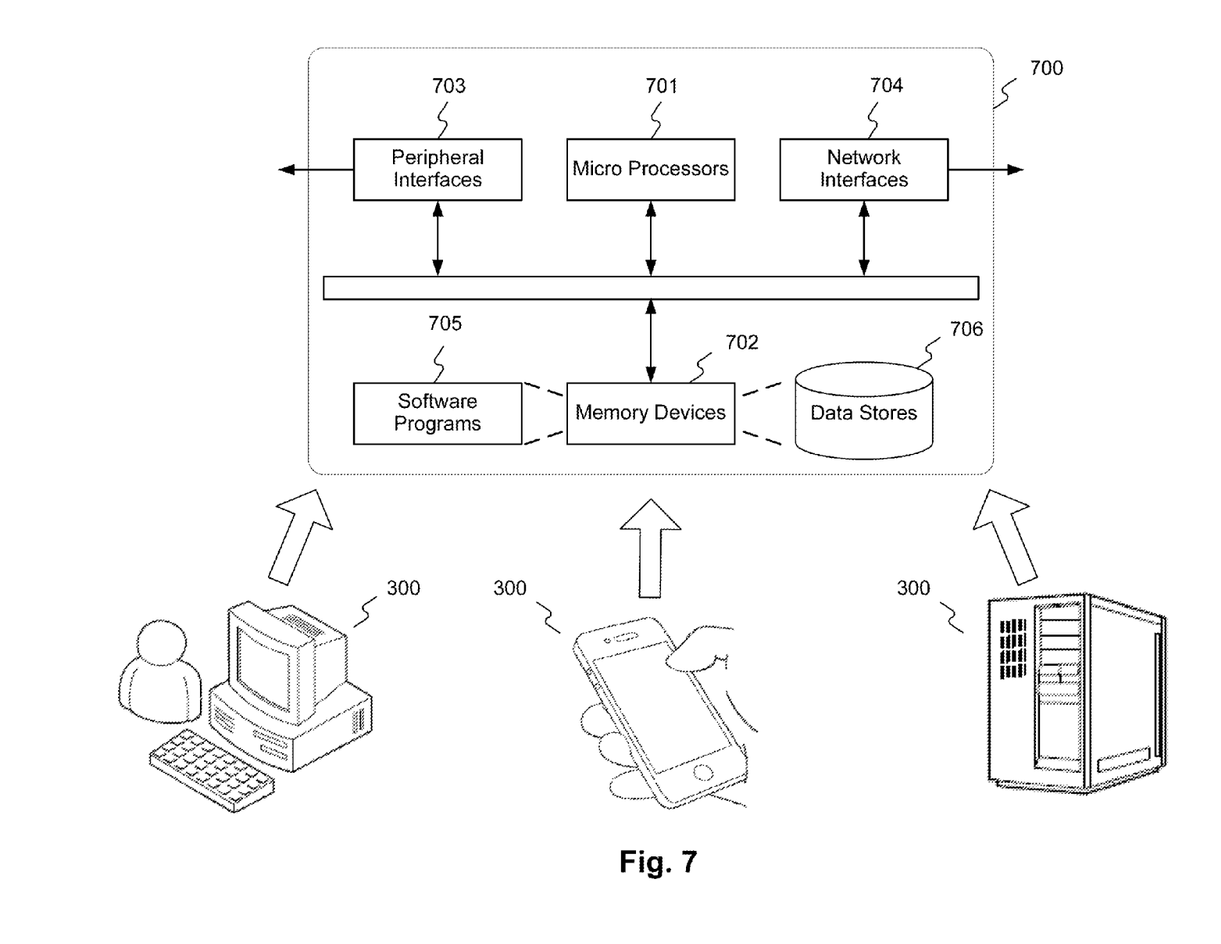
FIG. 7 is a diagram depicting an exemplary hardware configuration that may be used to implement one or more of the disclosed embodiments.

FIG. 7 is a diagram depicting an exemplary hardware configuration 700 for computing system 300, which may be a conventional desktop or laptop computer, a mobile device, a server, or other computing system. Computing system 300 may include one or more microprocessors 701 of varying core configurations and clock frequencies; one or more memory devices or computer-readable media 702 of varying physical dimensions and storage capacities, such as flash drives, hard drives, random access memory, etc., for storing data, such as files, images, and/or program instructions for execution by one or more microprocessors 701; one or more network interfaces 704, such as Ethernet adapters, wireless transceivers, or serial network components, for communicating over wired or wireless media using protocols, such as Ethernet, wireless Ethernet™, GSM, WiMAX™, etc.; and one or more peripheral interfaces 703, such as keyboards, mice, touchpads, computer screens, touchscreens, etc., for enabling human interaction with and manipulation of computing system 300. In some embodiments, the components of computing system 300 need not be enclosed within a single enclosure or even located in close proximity to one another.

Memory devices 702 may further be physically or logically arranged or configured to provide for or store one or more data stores 706, such as one or more file systems or databases, and one or more software programs 705, which may contain interpretable or executable instructions for performing one or more of the disclosed embodiments. Those skilled in the art will appreciate that the above-described componentry is exemplary only, as computing system 300 may comprise any type of hardware componentry, including any necessary accompanying firmware or software, for performing the disclosed embodiments. Computing system 300 may also be implemented in part or in whole by electronic circuit components or processors, such as application-specific integrated circuits (ASICs) or field-programmable gate arrays (FPGAs).

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, although embodiments have been described in terms of interaction with a user, the above-described techniques are equally applicable to implementations that do not involve human users. Thus, the same techniques may be used to execute programs according to instructions received from another program in computing system 300 or from another computing system altogether. Similarly, commands may be received, executed, and their output returned entirely within the processing and/or memory of computing system 300. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

In the above description and in the below claims, unless specified otherwise, the term "execute" and its variants are to be interpreted as pertaining to any operation of program code or instructions on a device, whether compiled, interpreted, or run using other techniques. Also, in the claims, unless specified otherwise, the term "function" is to be interpreted as synonymous with "method," and may include methods within program code, whether static or dynamic, and whether they return a value or not. The term "function" has been used in the claims solely to avoid ambiguity or conflict with the term "method," the latter of which may be used to indicate the subject matter class of particular claims.

What is claimed is:

1. A method of invoking a program associated with a command string, the method comprising:
 receiving the command string;
 dividing the command string into a plurality of tokens, wherein one or more of the plurality of tokens include a plurality of adjacent characters in the command string;
 using a processor, identifying a node-path within a trie data structure corresponding to the plurality of tokens, wherein:
  the trie data structure comprises a plurality of nodes arranged in a tree-like manner;
  each node in the plurality of nodes includes a lookup key in the form of a regular expression;
  one or more nodes in the plurality of nodes includes a value in the form of a program; and
  identifying the node-path comprises identifying a series of sequential, connected, descending nodes in the trie data structure such that the regular expression lookup key included in each node in the series matches a respective sequential token in the command string;
 determining that the lookup key included in a final node is a wildcard;
 extracting a program included in the final node in the node-path; and
 in response to determining the lookup key included in the final node is a wildcard, executing the program associated with the final node by providing one or more tokens subsequent to the token that matches the final node as arguments to the program.

2. A method of invoking a program associated with a command string, the method comprising:
receiving the command string;
dividing the command string into a plurality of tokens, wherein one or more of the plurality of tokens include a plurality of adjacent characters in the command string
using a processor, identifying a node-path within a trie data structure corresponding to the plurality of tokens, wherein
the trie data structure comprises a plurality of nodes arranged in a tree-like manner;
each node in the plurality of nodes includes a lookup key in the form of a text string;
the lookup keys included in one or more nodes in the data structure are regular expressions;
one or more nodes in the plurality of nodes is associated with a value in the form of a program; and
identifying the node-path comprises identifying a series of sequential, connected, descending nodes in the data structure such that the lookup key included in each node in the series matches a respective sequential token in the command string;
determining that the lookup key included in a final node is a wildcard;
extracting a program associated with the final node in the node-path; and
in response to determining that the lookup key included in the final node is a wildcard, executing the program associated with the final node by providing one or more tokens subsequent to the token that matches the final node as arguments to the program.

3. The method of claim 2, wherein the programs associated with one or more nodes in the data structure are stored as objects instantiated from classes containing one or more functions.

4. The method of claim 3, wherein executing the program comprises:
invoking the one or more functions stored in the object included in the final node in the node-path.

5. The method of claim 3, wherein the objects are instantiated from classes that are of type Java Runnable.

6. The method of claim 2, further comprising:
determining one or more capture results from capture groups defined by the regular expressions of one or more nodes in the series matching one or more tokens in the command string; and
using the one or more capture results to determine the program or to execute the program in a manner consistent with the one or more capture results.

7. The method of claim 2, further comprising:
determining that the lookup keys of two or more sibling nodes in the trie data structure match a token in the command string; and
selecting a node-path that includes a node from among the two or more sibling nodes that has a highest priority.

8. The method of claim 2, further comprising:
determining that the lookup keys of two or more sibling nodes in the trie data structure match a token in the command string;
prompting a user to select a lookup key from among the two or more sibling nodes; and
selecting a node-path that includes the node associated with the selected lookup key.

9. A system configured to invoke a program associated with a command string, the system comprising:
a processing system comprising one or more processors; and
a memory system comprising one or more computer-readable media, wherein the computer-readable media contain instructions stored thereon that, if executed by the processing system, cause the system to perform operations comprising:
receiving the command string;
dividing the command string into a plurality of tokens, wherein one or more of the plurality of tokens include a plurality of adjacent characters in the command string;
identifying a node-path within a trie data structure corresponding to the plurality of tokens, wherein
the trie data structure comprises a plurality of nodes arranged in a tree-like manner;
each node in the plurality of nodes includes a lookup key in the form of a text string;
the lookup keys included in one or more nodes in the trie data structure are regular expressions;
one or more nodes in the plurality of nodes is associated with a value in the form of a program; and
identifying the node-path comprises identifying a series of sequential, connected, descending nodes in the trie data structure such that the lookup key included in each node in the series matches a respective sequential token in the command string;
determining that the look key included in a final node is a wildcard;
extracting a program associated with the final node in the node-path; and
in response to determining that the lookup key in the final node is a wildcard, executing the program associated with the final node by providing one or more tokens subsequent to the token that matches the final node as arguments to the program.

10. The system of claim 9, wherein the programs associated with one or more nodes in the data structure are stored as objects instantiated from classes containing one or more functions.

11. The system of claim 10, wherein executing the program comprises:
invoking the one or more functions stored in the object included in the final node in the node-path.

12. The system of claim 10, wherein the objects are instantiated from classes that are of type Java Runnable.

13. The system of claim 9, the operations further comprising:
determining one or more capture results from capture groups defined by the regular expressions of one or more nodes in the series matching one or more tokens in the command string; and
using the one or more capture results to determine the program or to execute the program in a manner consistent with the one or more capture results.

14. The system of claim 9, the operations further comprising:
determining that the lookup keys of two or more sibling nodes in the trie data structure match a token in the command string; and
selecting a node-path that includes a node from among the two or more sibling nodes that has a highest priority.

15. The system of claim 9, the operations further comprising:

determining that the lookup keys of two or more sibling nodes in the trie data structure match a token in the command string;

prompting a user to select a lookup key from among the two or more sibling nodes; and selecting a node-path that includes the node associated with the selected lookup key.

16. A memory device containing instructions stored therein, wherein the instructions, if executed by a processing system within a computing system, cause the computing system to perform operations comprising:

receiving a command string;

dividing the command string into a plurality of tokens, wherein one or more of the plurality of tokens include a plurality of adjacent characters in the command string;

identifying a node-path within a trie data structure corresponding to the plurality of tokens, wherein the trie data structure comprises a plurality of nodes arranged in a tree-like manner;

each node in the plurality of nodes includes a lookup key in the form of a text string;

the lookup keys included in one or more nodes in the trie data structure are regular expressions;

one or more nodes in the plurality of nodes includes a value in the four of a program; and identifying the node-path comprises identifying a series of sequential, connected, descending nodes in the trie data structure such that the lookup key included in each node in the series matches a respective sequential token in the command string;

determining that the lookup key included in a final node is a wildcard;

extracting a program associated with the final node in the node-path; and in response to determining that the lookup key included in the final node is a wildcard, executing the program associated with the final node by providing one or more tokens subsequent to the token that matches the final node as arguments to the program.

17. The memory device of claim 16, wherein the programs included in one or more nodes in the trie data structure are stored as objects instantiated from classes containing one or more functions.

* * * * *